J. A. BEIRNS.
REGULATOR FOR MOTOR GENERATOR SYSTEMS.
APPLICATION FILED JULY 24, 1915.

1,297,989.

Patented Mar. 25, 1919.
2 SHEETS—SHEET 2

INVENTOR
John A. Beirns
BY
Raymond A. Parker.
ATTORNEY

UNITED STATES PATENT OFFICE.

JOHN A. BEIRNS, OF DETROIT, MICHIGAN.

REGULATOR FOR MOTOR-GENERATOR SYSTEMS.

1,297,989.   Specification of Letters Patent.   Patented Mar. 25, 1919.

Application filed July 24, 1915. Serial No. 41,656.

*To all whom it may concern:*

Be it known that I, JOHN A. BEIRNS, a citizen of the United States, residing at Detroit, county of Wayne, State of Michigan, have invented a certain new and useful Improvement in Regulators for Motor-Generator Systems, and declare the following to be a full, clear, and exact description of the same, such as will enable others skilled in the art to which it pertains to make and use the same, reference being had to the accompanying drawings, which form a part of this specification.

My invention relates to electromagnetic apparatus and a special object of my improvements is to provide an improved magneto generator system for use with electric starting apparatus for automobiles.

I accomplish this object in the device illustrated in the accompanying drawings in which, Figure 1 is a diagrammatic view of an apparatus embodying my invention and the circuits in a magneto generator system.

Fig. 4 is an enlarged detail view mostly in section of an apparatus embodying my invention.

$e$ is a magnet core. Around this core toward one end thereof is a coil $a$. $c$ is a coarse wire coil wound around said core toward the other end thereof and $b$ is a fine wire resistance coil wound around said core outside of the coil $c$.

$m$ $g$ is a magneto generator having the series coil $s$ $e$ and the shunt coil $s$ $h$. $k$ is a storage battery. The positive pole of the magneto generator is grounded at $n$ and the corresponding pole of the battery at $m$. The negative pole of the battery $k$ is connected through the starting switch $d$ with the negative pole of the magneto generator through the series coil $s$ $e$. $u$ is a wire leading from the negative pole of the battery to a contact point of the switch $d$ and branching therefrom by $u^2$ to the coil $c$. From the other contact point of the switch $d$ a wire $q$ leads to a contact point at $q^2$ and connects by a lead wire $r$ with the coil $a$ which coil is grounded at the other end at $t$ through a lead wire $s$. The shunt coil $s$ $h$ connects through the lead wire $o$ with the positive pole of the magneto generator and by a lead wire $p$ with the binding post $p^2$. The resistance coil $b$ is connected with $p^2$ and $q^2$ so that said coil is permanently connected across the poles of the magneto generator. $f$ is an armature adapted to be actuated by the core $e$ to complete a circuit at $i$ which armature is connected with the lead wire $q$ by a wire $v$ and with the lead wire $u$ through the coil $c$ and lead wire $u^2$.

$g$ is a magnetic core formed into a cylindrical shape and surrounding the coils $b$ $c$. $h$ is a regulating armature which normally forms a short circuit between the point $p^2$ and $q^2$. The armature $h$ is adapted to be actuated when the core $g$ is magnetized to break the contact at $j$ and interrupt the short circuit between the point $p^2$ and $q^2$ through said armature.

Figure 1:
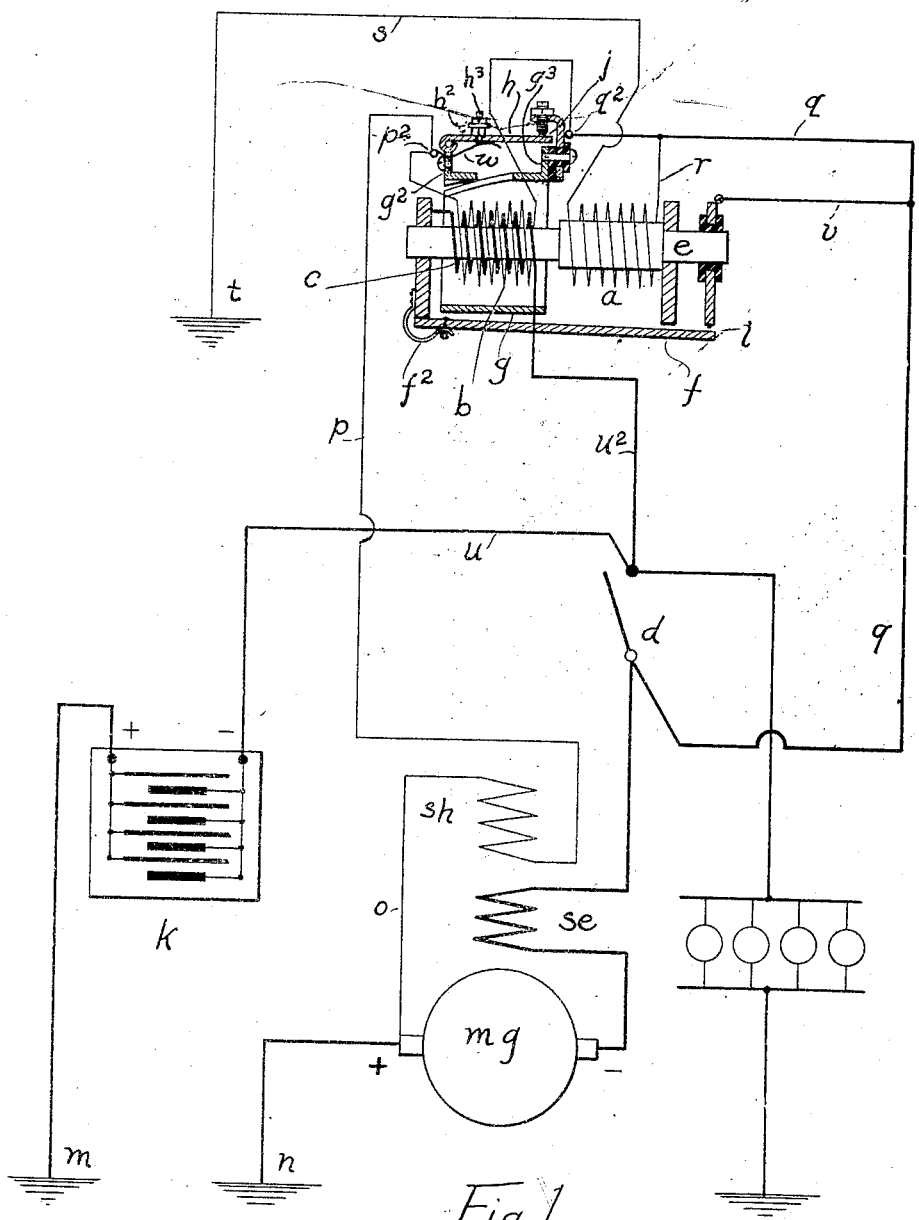
Figure 3:
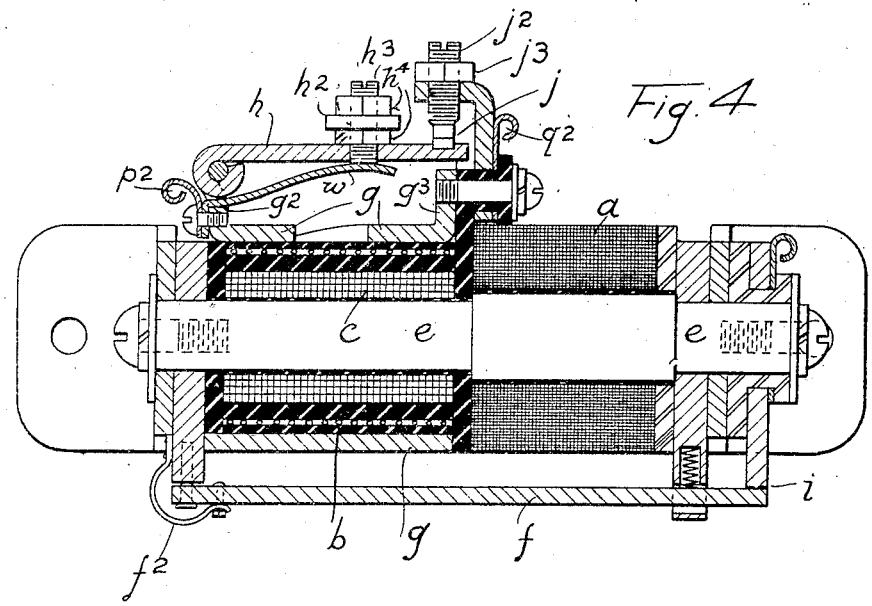
Fig. 3 illustrates the completed core.
Figure 2:
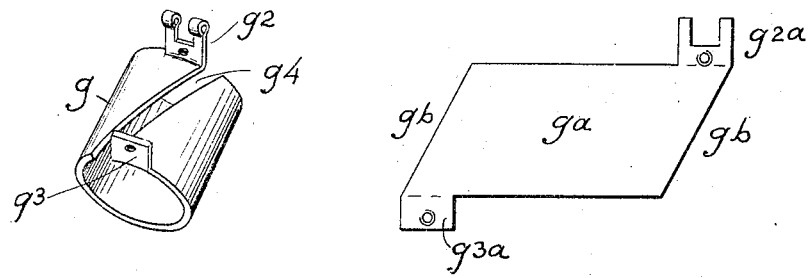
Fig. 2 is a detail view illustrating the construction of one of the magnetic cores.

It will be observed that the cylindrical core $g$ terminates at one end near one end of the core $e$ and at the other end near the center of the core $e$. The core $g$ is made up of a sheet of soft metal stamped in the shape shown in Fig. 2 having lugs $g^{3a}$ and $g^{2a}$ extending from its corners at such a position that when the body $g^a$ of the sheet is rolled into an approximately cylindrical form, as shown in Fig. 3, and said lugs bent upward, they will form projections forming the pole pieces of the core in one of which the armature $h$ may be pivoted and the other of said lugs will act to attract the other end of said armature to break the circuit at $j$ as herein described. The end edges $g^d$ $g^d$ of the blank $g^a$ extend at an angle to the other edges as distinctly shown in Fig. 2 so that the pole-pieces will be located at projecting corners where the magnetic flux will tend to concentrate. $w$ is a spring acting to hold the armature $h$ in position to make a contact at $j$.

$f^2$ is a spring tending to hold the armature $f$ out of contact with $i$.

For convenience I will call the armature $h$ a regulating armature and the armature $f$ a cut-out armature.

The operation of the above described device is as follows:

When it is desired to start the engine the switch $d$ is closed, the current then runs from the battery to the ground, to the positive pole of the magneto generator, through the series coil, and back to the negative pole of the battery, a current at the same time passing through the shunt coil, the conductor $p$, through the regulating armature $h$, and through the conductor $q$, switch $d$, conductor $u$ back to the negative pole of the battery. When the engine is started the switch $d$ is opened and when the speed of the magneto generator has risen so that its voltage as a generator exceeds the voltage of the battery, and to a certain predetermined value, the current from the generator passes to the ground $m$, to the ground $t$ through the conductor $s$, coil $a$, conductors $r$ and $q$ and the series coil back to the generator, there being also a branch circuit through the shunt coil and regulating armature $h$, as hereinbefore described. The current passing through the coil $a$ energizes the core $e$ which acts upon the cut-out armature $f$ to close the connection at $i$ thus short-circuiting the coil $a$, the current then runs from the magneto to the ground, through the battery, through the conductors $u$ and $u^2$, the coil $c$, the armature $f$ and returns to the magneto. When a current has arrived at a desired value beyond which it is desired that it should not go, the magnetism due to the coil $c$ attracts the armature $h$ breaking the contact at $j$. The short circuit of the coil $b$ being thus interrupted a larger current is thrown through said coil which acts to diminish the magnetism of the core $g$ and permit the spring $w$ to restore the armature $h$ to its former position again making contact at $j$. The breaking of the circuit at $j$ very greatly diminishes the current passing through the shunt coil $s$ $h$ so that the field circuit is thereby diminished and its production of current lessened. This action occurs repeatedly and very rapidly so that the armature $h$ is in rapid vibration and the current is thereby held at the required value.

If the cylinder $g$ is placed over the coil $a$ instead of in the position shown, the voltage, instead of the current will be regulated.

The cylindrical core $g$ may be easily adjusted over any suitable coil where required and its magnetic flux obtained from the inclosed helix without any additional expenditure of energy.

$h^3$ is a screw threaded rod extending from the armature $h$. There are nuts $h^4$ upon said rod and between these nuts is placed a small weight $h^2$. By selecting the weight $h^2$ the rate of vibration of the armature $h$ can be regulated so as to adapt the device to different purposes. While for convenience I refer to the core within the helix, it is of course obvious that the helix would operate to a limited extent for the interior magnetic circuit if the interior core were omitted.

What I claim is:

1. In an electromagnetic apparatus, a core, an energizing coil surrounding said core, a second core, located at one side of and substantially parallel to the first named core and outside of its energizing coil adapted to be energized by said coil, an armature adapted to be actuated solely by the first named core, and an armature adapted to be actuated solely by said other core.

2. In an electromagnetic apparatus, a core, an energizing coil surrounding said core, a second core located at one side of and substantially parallel to the first named core, and outside of its energizing coil and having one of its ends intermediate the ends of the first named core adapted to be energized by said coil, an armature adapted to be actuated by the first named core, and an armature adapted to be actuated by said other core having a pole located intermediate of the ends of the first named core.

3. In an apparatus of the kind described, a core, a coil surrounding said core, a second core of cylindrical form sleeved over said coil, an armature adapted to be actuated solely by the magnetism of the first named core and an armature adapted to be actuated solely by the magnetism of said other core.

4. In an apparatus of the kind described, a core, a coil surrounding said core, a second core of cylindrical form sleeved over said coil, an armature adapted to be actuated by the magnetism of the first named core and an armature adapted to be actuated by the magnetism of said other core, an end of said outer core being intermediate the ends of said inner core and having its armature located at said intermediate end.

5. A core consisting of a single sheet of magnetic material bent into the form of a cylinder, the sides of said sheet constituting the end edges of said cylinder and the end edges of said sheet lying adjacent and parallel to each other, a lug turned up from said sheet at the junction of a side and end edge thereof to form a pole piece.

6. A core consisting of a single sheet of magnetic material bent into a circular form in cross section, the sides of said sheet constituting the end edges of said cylinder and the end edges of said sheet lying adjacent and parallel to each other and extending over less than 180 degrees of the cylinder so formed, said end edges being at an angle to the side edges so that they shall lie in a spiral on the cylinder formed.

7. In an apparatus of the kind described, a core, an energizing coil surrounding said core, a second core of cylindrical form sleeved over said coil, its inner end extending to a point intermediate the ends of said inner core, an armature adapted to be actuated by the magnetism of the first named core, and an armature adapted to be actuated by the magnetism of the inner end of said outer core.

8. A hollow cylindrical magnetic core having its wall continuous from end to end divided in a plane oblique to a plane through the axis and at such an angle to the axis that it shall cut the end edges of said wall at points less than 180 degrees from each other.

9. A hollow cylindrical magnetic core having its wall continuous from end to end divided in a plane oblique to a plane through the axis and at such an angle to the axis that it shall cut the end edges of said wall at points less than 180 degrees from each other, and lugs extending upward from the acute corner of said wall.

10. A core consisting of a single sheet of magnetic material bent into the form of a cylinder, the sides of said sheet constituting the end edges of said cylinder and the end edges of said sheet lying adjacent and parallel to each other, said end edges being at an angle to the side edges so that they shall lie in a spiral on said cylinder, a portion of said magnetic material being turned up to form a pole at a junction between said side and end edges where said edges are at an acute angle to each other.

In testimony whereof, I sign this specification.

JOHN A. BEIRNS.